United States Patent [19]

Yankoff

[11] 4,312,250
[45] Jan. 26, 1982

[54] CUTTING INSERT AND METHOD OF MACHINING THEREWITH

[76] Inventor: Gerald K. Yankoff, 4417 Kitty La., Batavia, Ohio 45103

[21] Appl. No.: 112,643

[22] Filed: Jan. 16, 1980

[51] Int. Cl.³ .......................... B23B 1/00; B26D 1/00
[52] U.S. Cl. ...................................... 82/1 C; 407/114
[58] Field of Search ................. 82/1 C; 407/114, 116, 407/117, 113, 119, 120

[56] References Cited

U.S. PATENT DOCUMENTS

| | | | |
|---|---|---|---|
| 3,187,406 | 6/1965 | Franko | 407/114 |
| 3,786,541 | 1/1974 | Lundgren | 407/116 |
| 3,792,515 | 2/1974 | Lundgren | 407/116 |
| 3,875,663 | 4/1975 | Gustafson et al. | 407/114 |
| 4,124,326 | 11/1978 | Cost | 407/114 |
| 4,159,884 | 7/1979 | Schott | 407/113 |
| 4,214,846 | 7/1980 | Kraemer | 407/114 |

OTHER PUBLICATIONS

"Bearing Lands and Negative Rakes Prolong Cutting Tool Life" M. W. Purser, American Machinist, 8-2-45, pp. 118-121.

Primary Examiner—Leonidas Vlachos
Attorney, Agent, or Firm—James W. Pearce; Roy F. Schaeperklaus

[57] ABSTRACT

A one-piece indexable cutting insert for a machine tool and method of machining therewith. The insert has opposed support faces and side walls, with the side walls being provided with cutting edge portions along spaced lengthwise edges. Each cutting edge portion includes a pressure land intersecting the side wall and extending inwardly therefrom, a relief land inboard of the pressure land and a chip breaker groove inboard of the pressure land. The pressure lands diverge from the side wall at such an angle that a normal to one of the pressure lands is directed into an opposed support face inboard of the chip breaker groove thereof. The method includes the steps of mounting the insert in the machine tool with one of said pressure lands in cutting relation to the workpiece and an opposed support face in supported relation, advancing the workpiece and the cutting insert in cutting relation to effect metal removal from the workpiece and causing forces on said one of the pressure lands to be directed into the opposed support face where the opposed support face is supported.

12 Claims, 6 Drawing Figures

CUTTING INSERT AND METHOD OF MACHINING THEREWITH

This invention relates to metal cutting devices. More particularly, this invention relates to indexable cutting inserts for a metal cutting tool.

The cutting inserts can be exposed directly to the metal to be cut and can be used in various metal cutting tools such as turning, milling and planing tools and the like. Such cutting inserts are formed of hard material such as tungsten carbide or the like and are strong in compression but can be weak in tension, and loading thereof in tension can lead to catastrophic failure.

An object of this invention is to provide an indexable insert in which stresses are essentially in compression during use.

In such cutting inserts, it is common to have a chip breaking groove inboard of each cutting edge portion with support for the insert being inboard of a chip breaking groove in a support face opposed to the cutting edge portion. A further object of this invention is to provide a cutting insert in which the major load on a cutting edge portion during cutting is in a direction toward a supported portion of the opposed support face so that loads in the insert are substantially in compression and not in tension.

Briefly, this invention provides an indexable cutting insert having a body provided with spaced generally planar and parallel support faces and side walls extending substantially normally to the support faces. At least one of the side walls is provided with cutting edge portions along spaced lengthwise edges. The cutting edge portions include pressure lands which diverge from the side wall inwardly of the cutting insert. Relief lands intersect the pressure lands and extend inwardly to chip breaker grooves. Inboard of the chip breaker grooves are the support faces. The insert is mounted for cutting engagement of one of the pressure lands with a workpiece and with an opposed support face supported by a back-up member. The pressure land is so oriented that the force thereagainst is directed toward the opposed support face inboard of the chip breaker groove thereof so that the major or essential forces in the insert are in compression.

This invention also provides a method of machining a workpiece with a machine tool employing an indexable cutting insert having spaced parallel support faces, at least one side wall extending substantially normally to the support faces, pressure lands diverging from opposed lengthwise edges of the side walls inwardly of the insert, and relief lands inboard of the pressure lands that converge inwardly of the insert from lines of intersection with the pressure lands and merge into chip breaker grooves. The method includes the steps of (1) mounting the insert on the machine tool with one of the pressure lands in cutting relation to the workpiece and an opposed support face in supported relation; (2) advancing the workpiece and cutting insert relative to each other in cutting relation to effect metal removal from the workpiece; and (3) causing the forces on said one of the pressure lands to be directed into the opposed support face.

The above and other objects and features of the invention will be apparent to those skilled in the art to which this invention pertains from the following detailed description and the drawings, in which.

In the following detailed description and the drawing, like reference characters indicate like parts.

Figure 1:
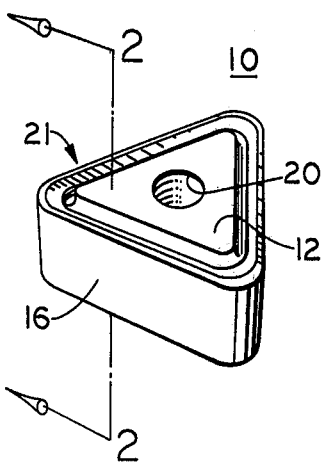
FIG. 1 is a perspective view of a cutting insert constructed in accordance with an embodiment of this invention.
Figure 2:
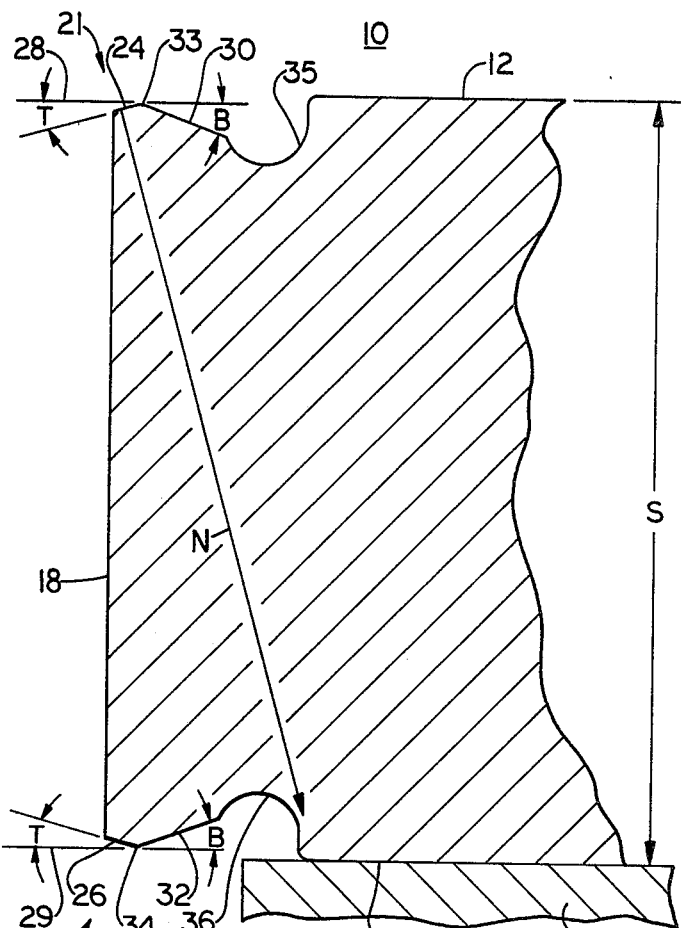
FIG. 2 is a fragmentary view in section taken on an enlarged scale on the line 2—2 in FIG. 1, a portion of a back-up member being shown in association with the cutting insert.

In FIGS. 1 and 2 is shown an indexable cutting insert 10 which is constructed in accordance with an embodiment of this invention. The insert includes opposed support faces 12 and 14, which are substantially parallel. The insert 10 is shown of a generally triangular shape with three side walls, two of which are shown at 16 (FIG. 1) and 18 (FIG. 2). The side walls extend substantially perpendicularly to the support faces 12 and 14. A transverse opening 20 is provided in the insert 10 spaced from the side walls for receiving a fastener (not shown) for attaching the insert to a back-up member 22 (only a portion of which is shown) of a tool (not shon in detail). If desired, the insert can be formed with additional side walls.

Cutting edge portions 21 ans 23 are formed along lengthwise edges of the side wall 18. The cutting edge portions include pressure lands 24 and 26 which intersect the side wall 18. The pressure lands 24 and 26 diverge inwardly of the insert from the side wall 18 at angles T to planes 28 and 29, respectively, which are parallel to the support faces 12 and 14. Relief lands 30 and 32 intersect the pressure lands 24 and 26 at lines of intersection 33 and 34, respectively, and converge inwardly of the insert at angles B to the planes 28 and 29, respectively. Inboard of the relief lands 30 and 32 are formed chip breaker grooves 35 and 36, respectively. The chip breaker grooves 35 and 36 terminate at the support faces 12 and 14, respectively. Similar arrangements of presssure lands, relief lands, and chip breaker grooves can be formed at lengthwise edges of the other side walls.

As shown in FIG. 2, the thickness of the insert 10, as indicated at S in FIG. 2, and the angle T are so selected that a plane normal to the pressure land 24, as indicated by an arrow N, passes into the support face 14 inboard of the chip breaker groove 36 where the support face 14 is supported by the back-up member 22 so that force on the pressure land 24 causes essentially compressive forces in the insert and not tension forces.

Figure 3:
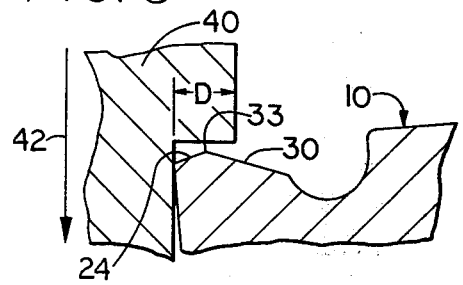
FIG. 3 is a fragmentary view in section showing the insert and a fragmentary portion of a workpiece before the start of a cut.
Figure 4:
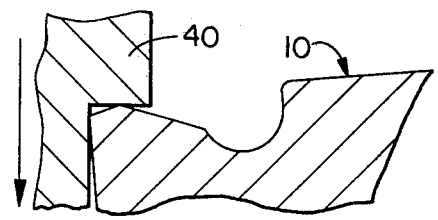
FIG. 4 is a fragmentary view in section showing the insert and the workpiece as a cut starts.
Figure 5:
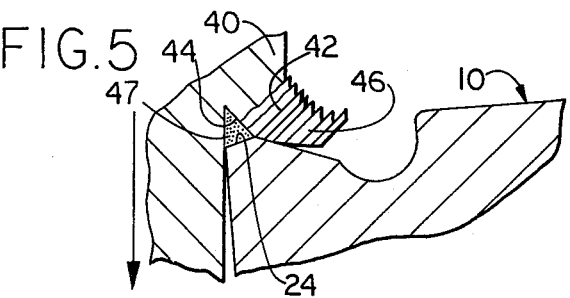
FIG. 5 is a fragmentary view in section showing the insert and the workpiece with a chip starting to form.
Figure 6:
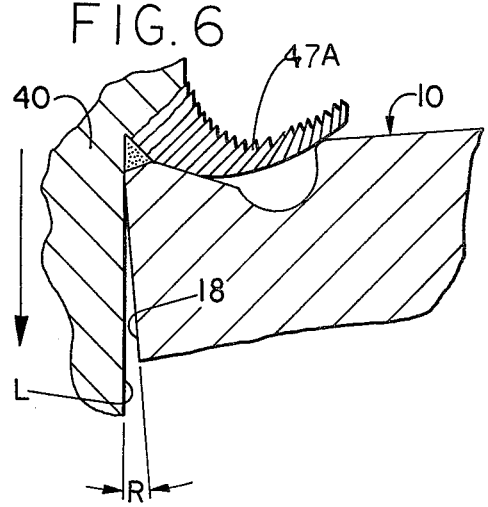
FIG. 6 is a fragmentary view in section showing the insert and the workpiece with the chip more fully formed.

The operation of the insert is illustrated in FIGS. 3–6 inclusive. A workpiece 40 is cut by the insert 10. The direction of movement of the workpiece relative to the cutting insert 10 is indicated by an arrow 42. In FIG. 3, the depth of cut is indicated at D. A line of cut is indicated in FIG. 6 at L. The cutting insert 10 is supported with the side wall 18 at a small angle R to the line of cut L and with the line of intersection 33 (FIG. 3) between the pressure land 24 and the relief land 30 arranged to engage the workpiece at approximately the center of the cut.

In FIG. 3, the workpiece 40 is shown just prior to the start of a cut. As the workpiece 40 engages the cutting insert 10 as shwon in FIG. 4, resilient deformation of the workpiece can occur at and on both sides of the line of intersection 33 until the material of the workpiece starts to shear along shear planes 42 and 44, as shown in FIG. 5 and a chip 46 starts to form. The shear planes 42 and 44 can be at an included angle of about 90 degrees to each other. In addition, part of the material of the workpiece is trapped between the pressure land 24 and the shear plane 44 as indicated at 47, and is crushed by the pressure land 24 as the cut advances. As the cut advances, the shearing causes the chip to enlarge as indicated at 47A (FIG. 6).

When necessary, the cutting insert 10 can be indexed to present another pressure land to the workpiece. The machine tool with which the cutting insert is used can be one which performs any of the usual metal cutting or removing operations such as turning, facing, boring, milling, planing, and drilling.

The minimum value for the angle T is determined by the geometry of the insert, including the thickness S and the depth of the chip breaker grooves 35 and 26. Preferably, the angle T is a minimum for minimum force on the cutting insert. The angle B is preferably about 5 degrees larger than the angle T. Suitable inserts can have an angle T of 10 degrees to 20 degrees, with an insert having the angle T of 15 degrees being particularly useful. The width of each of the pressure lands 24 and 26 can be about ½ of the depth of cut D and can be in the range of 0.005 inches to 0.060 inches, a preferred cutting insert having pressure lands having a width of 0.010 inches. The width of each of the relief lands 30 and 32 can be sufficient to guide and direct an appropriate chip 46 and can be about two or three times the width of the associated pressure land, with each of the relief lands merging into an associated chip breaker groove. The distance from the side wall 18 to the innermost parts of the chip breaker grooves 35 and 36 can be generally in the range of 0.060 inches to 0.125 inches and can be of a size required for proper chip breaker grooves.

The cutting insert illustrated in the drawing and described above is subject to structural modification without departing from the spirit and scope of the appended claims.

Having described my invention, what I claim as new and desire to secure by Letters Patent is:

1. A one-piece indexable cutting insert for a machine tool which comprises opposed support faces and side walls, at least one of the side walls being provided with cutting edge portions along spaced lengthwise edges, each cutting edge portion including a pressure land intersecting the side wall and extending inwardly therefrom, a relief land inboard of the pressure land and extending inwardly from a line of intersection with the pressure land, and a chip breaker groove inboard of the relief land, the pressure lands diverging from said one of the side walls at such an angle that a normal to one of the pressure lands is directed into an opposed one of the support faces inboard of the chip breaker groove thereof.

2. A cutting insert as in claim 1 in which the width of the pressure land is approximately ½ of the depth of cut by the insert.

3. A cutting insert as in claim 1 which is mounted in the machine tool for engagement of one of the lines of intersection approximately at the middle of the cut and in which the opposed support face is supported by the machine tool.

4. A cutting insert as in claim 1 in which the relief lands converge from the line of intersection with the pressure lands inwardly of the insert.

5. A cutting insert as in claim 1 in which the width of the pressure land is approximately 0.0005 inches to 0.060 inches.

6. A cutting insert as in claim 1 in which the width of the pressure land is approximately 0.010 inches.

7. A cutting insert as in claim 1 in which the angle between the pressure land and a plane parallel to an opposed support face is approximately 10 degrees to 20 degrees.

8. A cutting insert as in claim 1 in which the angle between the pressure land and a plane parallel to an opposed support face is approximately 15 degrees.

9. A cutting insert as in claim 7 in which the angle between said plane and the relief land is approximately 5 degrees greater than the angle between said plane and the pressure land.

10. A cutting insert as in claim 8 in which the angle between said plane and the relief land is approximately 5 degrees greater than the angle between said plane and the pressure land.

11. A method of machining a workpiece using a machine tool employing an indexable cutting insert having opposed support faces and at least one side wall having cutting edge portions along spaced lengthwise edges, each cutting edge portion including a pressure land intersecting the side wall, a relief land inboard of the pressure land, and a chip breaker groove inboard of the relief land, the method including the steps of mounting the insert in the machine tool with one of said presssure lands in cutting relation to the workpiece and an opposed support face in supported relation, advancing the workpiece and the cutting insert in cutting relation to effect metal removal from the workpiece, and causing forces on said one of the pressure lands to be directed into the opposed support face inboard of the chip breaker groove thereof where the opposed support face is supported.

12. A method as in claim 11 in which the width of said one of the pressure lands is approximately ½ of the depth of cut by the insert.

* * * * *